United States Patent [19]
von Taschitzki

[11] Patent Number: 5,996,532
[45] Date of Patent: Dec. 7, 1999

[54] WATERER

[75] Inventor: Martin von Taschitzki, Lohmar, Germany

[73] Assignee: Arato L.P., Raleigh, N.C.

[21] Appl. No.: 09/119,505

[22] Filed: Jul. 21, 1998

[30]    Foreign Application Priority Data

Dec. 5, 1997 [DE]   Germany ................. 297 21 559 U

[51] Int. Cl.$^6$ ............................................ A01K 7/00
[52] U.S. Cl. ............................................ 119/72; 119/515
[58] Field of Search ..................... 119/72, 75, 464, 119/477, 515; 248/74.1

[56]    References Cited

U.S. PATENT DOCUMENTS

| | | | |
|---|---|---|---|
| 3,645,234 | 2/1972 | Schroer | 119/477 |
| 4,173,948 | 11/1979 | Austin | 119/72 |
| 4,348,989 | 9/1982 | Vik | 119/72 |
| 5,687,938 | 11/1997 | Bailey | 248/74.1 |

*Primary Examiner*—Robert P. Swiatek
*Attorney, Agent, or Firm*—Diller, Ramik & Wight, PC

[57]    ABSTRACT

A waterer with an essentially vertical water pipe (2), having at least one water valve (3), a mounting unit (4) for mounting on an animal housing, grazing or feeding facility, and a height adjustment device (5) for adjusting the distance between the ground and the water valve (3), is designed in order to simplify the operation of the height adjustment device and to firmly secure the water pipe against rotating and sliding, such that the mounting unit (4) is provided with an angle section (6) extending in the longitudinal direction of the water pipe (2), where the water pipe (2) is positioned against the two legs (7, 8) of the angle section (6) and the legs (7, 8) are connected by a clamping device (9) reaching around the water pipe (2), with which the legs (7, 8) and the clamping device (9) can be clamped to the water pipe (2).

10 Claims, 1 Drawing Sheet

WATERER

BACKGROUND OF THE INVENTION

The invention relates to a waterer with an essentially vertical water pipe, having at least one water valve, a mounting unit for mounting on an animal housing, grazing or feeding facility, and a height adjustment device for adjusting the distance between the ground and the water valve.

A known waterer of the generic type described is frequently mounted on bars partitioning an animal housing facility into several areas. The bars usually run horizontally and parallel to one another, and are positioned in a plane perpendicular to the ground.

The mounting unit of the known waterer is usually fitted with two U-bolts. The ends of the U-bolts are provided with threads. The two U-bolts are mounted at a distance from one another in parallel planes. The water pipe is placed in the open ends of the U-bolts. The side of the pipe facing the threads of the U-bolts rests against the bars of the animal housing facility. As a rule, the U-bolts are mounted close to the bars of the animal housing facility. The threads of the U-bolts extend beyond the bars. A clamping plate is provided which has holes for the purpose of being slipped onto the threads of the U-bolts. The clamping plate is secured by nuts, which are screwed onto the threads of the U-bolts. The water pipe, the bars and the clamping plate are positioned between the ends of the U-bolts and the nuts, and are braced against one another.

The disadvantage of this design lies in the fact that the clamping forces are only transmitted via small, nearly punctiform points of contact between the U-bolt and the water pipe, and between the water pipe and the bar. The water pipe and the entire waterer can easily be shifted in the direction transverse to the opposing points of contact. Large forces acting on the water pipe in the direction of the bars can easily shift the watering unit along the bars. This can cause the mounting unit to become loose or tilt. On the one hand, this entails a great risk of injury to the animals and, on the other hand, it can make it very difficult for the animals to drink.

The greatest difficulty arising in practice is that, when the waterer is mounted using the opposing points of contact, it can very easily be rotated about the longitudinal axis of the water pipe. This leads to a situation where the water valve lies against the wall of the animal housing facility or rotates beneath the bars of the animal housing facility into an adjacent area and is no longer accessible to the animals.

Furthermore, the height adjustment device of the known waterer is difficult to operate. The four nuts screwed onto the threads of the U-bolts must be loosened and then retightened after adjusting the water pipe.

The nuts must have very high tightening torques in order to prevent the water pipe from rotating about its longitudinal axis. The corrosion and contamination of this screw connection compounds the difficulty in loosening the nuts. Given the large number of waterers, an immense amount of work is involved in adjusting the height of the water valves.

In the case of pig breeding, for example, the water valves on a large number of waterers must be adjusted at short intervals. The rapid growth of the young animals, which start out with a weight of approx. 20 kg and leave the animal housing facility with a weight of approx. 125 kg, requires the correct setting of the height of the water valves above the floor of the housing facility. A water valve that is incorrectly set too low, for example, prevents the animals from obtaining enough water and causes high water losses.

SUMMARY OF THE INVENTION

Thus, the invention is based on the task of designing a waterer which can be manufactured simply and inexpensively and is equipped with a height adjustment device that can be operated with little effort and firmly secures the water pipe against rotating and sliding.

According to the invention, the task is solved in that the mounting unit is provided with an angle section extending in the longitudinal direction of the water pipe, where the water pipe is positioned against the two legs of the angle section and the legs are connected by a clamping device reaching around the water pipe, with which the legs and the clamping device can be clamped to the water pipe.

This simple design, in which only one clamping device need be operated instead of four nuts, firmly holds the water pipe in place so that it cannot rotate or slide. This is due to the water pipe being in contact with the legs of the angle section and with the clamping device over the circumference of the water pipe. This contact, which is distributed over three points, provides for the very good transmission of forces.

In an advantageous configuration, the clamping device is provided with an angled bolt which passes through holes provided in the end sections of the legs. On the one hand, the simplicity of this clamping device makes the height adjustment device of the waterer particularly easy to operate and, on the other hand, it is very inexpensive to manufacture from standard bolts. In the event of damage to the clamping device, the user of the waterer can repair it himself by bending a bolt of corresponding size and using it to repair the waterer.

The legs of the angle section and the ends of the bolt are each preferably positioned at an angle of roughly 90° to one another. This design is advantageous for operation and also for the manufacture of the waterer. For example, the angle section can be made of bar-shaped steel material with an L-shaped cross-section, which is particularly inexpensive.

Of course, angle sections with an obtuse or acute angle can also be used. Angle sections with an acute angle can be used as long as there is room for the water pipe between the legs of the angle section. It is also advantageous if the angle section is not square-edged, but rather rounded at the crown of the angle. The side of the rounded area facing the water pipe can have the same radius as the outer radius of the water pipe. In this way, the angle section fits particularly tightly against the water pipe. This ensures the very effective transmission of forces.

For the sake of simplicity, one of the two ends of the bolt passing through the legs is provided with an abutment which acts on the respective leg, the other end being provided with a tension nut. The head of a screw can act as a rigid abutment. However, a bolt with threads on both ends is preferably used, where the abutment is formed by a lock nut screwed onto the corresponding end of the bolt. This results in a variable clamping device which, using the adjustment options afforded by the lock nut, can be adjusted in such a way that water pipes of different diameters can be clamped.

In order to be able to adjust the height of the water valve above the floor of the animal housing facility, only the tension nut need be adjusted on the completely assembled waterer.

The lock nut need only be correctly set once during initial installation. As compared to the known waterer, very much less work is required to regularly adjust the height of the water valves on numerous waterers of this kind.

In order to simplify the assembly and operation of the waterer, at least the hole of one of the legs of the angle section is designed as a slot extending in the radial direction of the water pipe and is open up to the free end of the leg in pocket-like fashion. When installing the waterer, the water pipe is positioned in the angle section. The bolt can then be inserted by a simple translatory motion with one end in the hole of the one leg and the other end in the slot of the other leg. The lock nut and the tension nut can then be screwed onto the threaded ends and the water pipe clamped tight.

In order for the tension nut to be adjustable at any time using a conventional wrench, it is provided with an external hexagon profile. The tension nut is even more variable and easy to adjust if it is additionally provided with a hole transverse to its thread, into which a long tool can be inserted. Various different tools can thus be used to adjust the height of the water valves. As a result, a suitable tool is always on hand.

The mounting unit is expediently provided with a mounting plate, one end of which is connected to the free end of one of the legs of the angle section and which extends over the side of the respective leg facing away from the water pipe. Due to its position, the mounting plate does not hinder the handling of the clamping device or the water pipe during installation or adjustment work.

The invention is described in detail below based on an example illustrated in the drawings. The drawings show the following:

DESCRIPTION OF THE PREFERRED EMBODIMENTS

Figure 1:
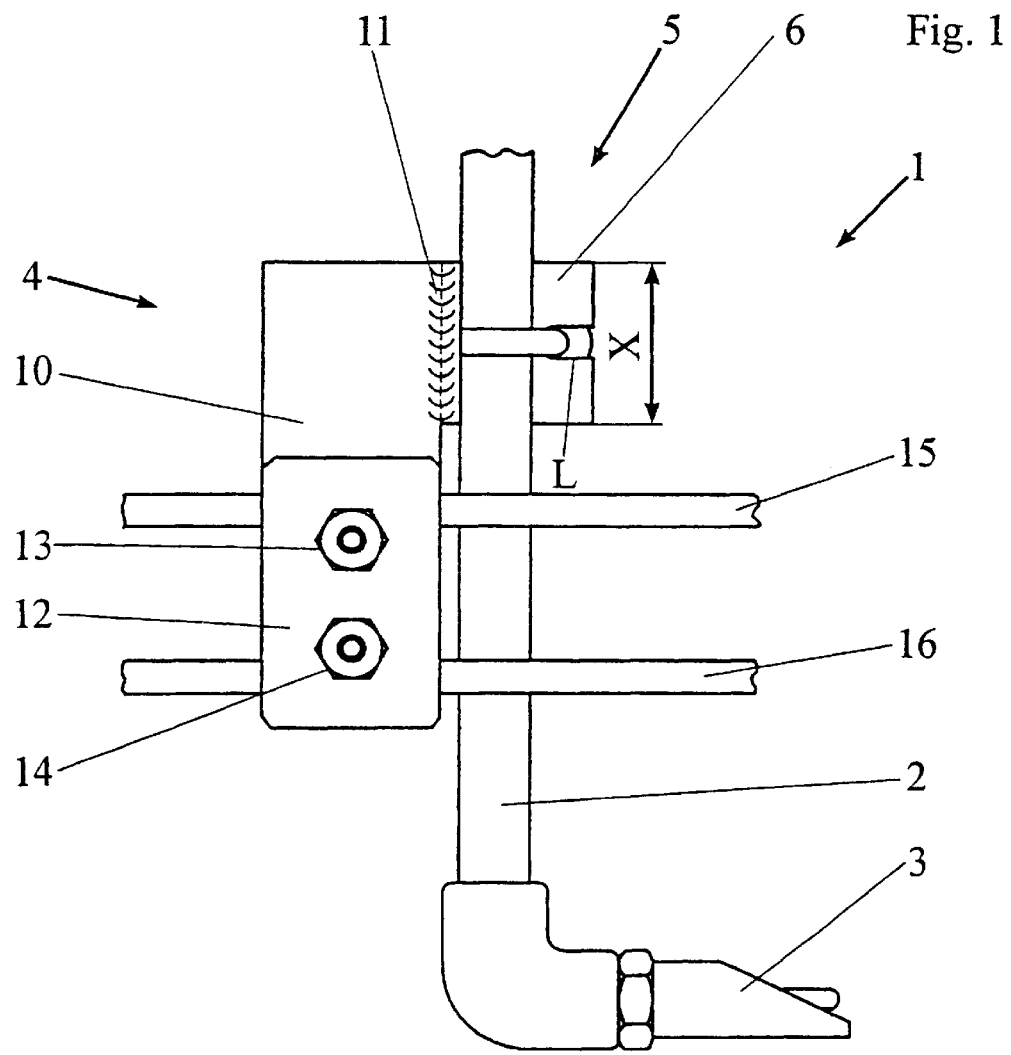
FIG. 1 A front view of the waterer.

According to the drawing, waterer 1 consists of a water pipe 2, running essentially vertically, which is provided with a water valve 3, a mounting unit 4 and a height adjustment device 5 for adjusting the height of water valve 3 above the floor. Mounting unit 4 is provided with an angle section 6 extending in the longitudinal direction of water pipe 2 and having two legs 7 and 8 against which water pipe 2 rests. Legs 7 and 8 are connected by a clamping device 9 reaching around water pipe 2, with which legs 7 and 8 and clamping device 9 can be clamped to water pipe 2. Mounting unit 4 has a mounting plate 10, one end of which is connected to free end 7a of one of the legs 7 of angle section 6 and extends over the side of the respective leg 7 facing away from water pipe. In the configuration shown, mounting plate 10 is connected to the free end 7a of leg 7 by way of a welded joint 11. In the present practical example, mounting plate 10 has a clamping plate 12, where mounting unit 4 and clamping plate 12 are provided with holes which accommodate two through-bolt connections 13 and 14.

Waterer 1 is mounted on two bars 15 and 16 of an animal housing facility which are a distance apart and run horizontally. Bars 15 and 16 are positioned horizontally between mounting plate 10 and clamping plate 12. Mounting plate 10 and clamping plate 12 are clamped between bolt head 13a and nut 13b of through-bolt connection 13, and thus secured to bars 15 and 16. The same applies to through-bolt connection 14.

Clamping device 9 has an angled bolt 17 which passes through the holes provided in the end sections of legs 7 and 8. The hole in the end section of leg 8 is designed as a slot L, extending in the radial direction of water pipe 2, and is open up to free end 8a of leg 8 in pocket-like fashion.

Both ends of bolt 17 are provided with threads 17a and 17b. Bolt 17 has an abutment in the form of a lock nut 18 on thread 17a passing through leg 7. A tension nut 19 is screwed onto the other end provided with thread 17b. To permit the simple use of a wrench, tension nut 19 has an external hexagon profile. In addition, a hole 20 is positioned transverse to the thread of tension nut 19, into which a long tool can be inserted. In this way, tension nut 19 can be adjusted with various different tools. A T-handle (not shown), similar to that on a vice, can also be provided in hole 20, so that tension nut 19 is permanently provided with a tightening tool for adjustment.

Figure 2:
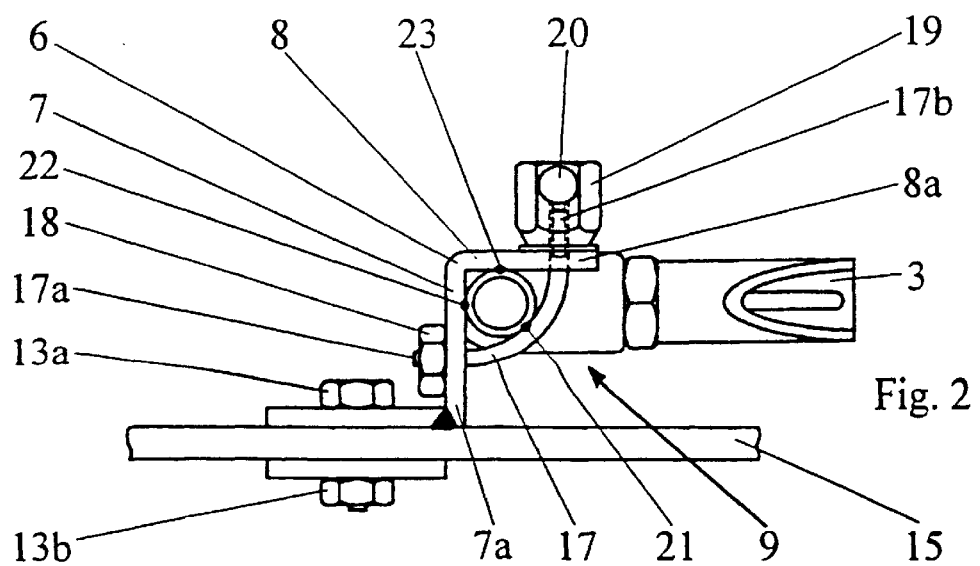
FIG. 2 A top view of the waterer.

Legs 7 and 8 of angle section 6, and the ends of bolt 17, are each positioned at an angle of roughly 90° relative to one another. FIG. 2 shows that water pipe 2 is clamped at points of contact 21, 22 and 23 distributed around its circumference. Points of contact 22 and 23 between water pipe 2 and legs 7 and 8 extend over the entire length X of angle section 6. In this practical example, length X is roughly twice as large as the diameter of water pipe 2. Point of contact 21 has a smaller, linear contact surface. It extends in the circumferential direction of water pipe 2.

Although a preferred embodiment of the invention has been specifically illustrated and described herein, it is to be understood that minor variations may be made in the apparatus without departing from the spirit and scope of the invention, as defined the appended claims.

What is claimed is:

1. Waterer with an essentially vertical water pipe (2), having at least one water valve (3), a mounting unit (4) for mounting on an animal housing, grazing or feeding facility, and a height adjustment device (5) for adjusting the distance between the ground and the water valve (3), characterized in that the mounting unit (4) is provided with an angle section (6) extending in the longitudinal direction of the water pipe (2), where the water pipe (2) is positioned against the two legs (7, 8) of the angle section (6) and the legs (7, 8) are connected by a clamping device (9) reaching around the water pipe (2), with which the legs (7, 8) and the clamping device (9) can be clamped to the water pipe (2).

2. Waterer as per claim 1, characterized in that the clamping device (9) is provided with an angled bolt (17) which passes through holes provided in the end sections of the legs (7, 8).

3. Waterer as per claim 2, characterized in that the legs (7, 8) of the angle section (6) and the ends of the bolt (17) are each positioned at an angle of roughly 90° to one another.

4. Waterer as per claim 3, characterized in that one of the two ends of the bolt (17) passing through the legs (7) is provided with an abutment which acts on the respective leg (7), the other end being provided with a tension nut (19).

5. Waterer as per claim 2, characterized in that one of the two ends of the bolt (17) passing through the legs (7) is provided with an abutment which acts on the respective leg (7), the other end being provided with a tension nut (19).

6. Waterer as per claim 5, characterized in that the abutment is designed as a lock nut (18), screwed onto the corresponding end (17a) of the bolt (17).

7. Waterer as per claim 5, characterized in that the tension nut (19) is provided with an external hexagon profile to accommodate a wrench.

8. Waterer as per claim 5, characterized in that the tension nut (19) is provided with a hole (20) transverse to its thread, into which a long tool can be inserted.

9. Waterer as per claim 5, characterized in that the mounting unit (4) is provided with a mounting plate (10), one end of which is connected to the free end (7*a*) of one of the legs (7) of the angle section (6) and which extends over the side of the respective leg (7) facing away from the water pipe (2).

10. Waterer as per claim 2, characterized in that at least the hole of one of the legs (8) of the angle section (6) is designed as a slot (L) extending in the radial direction of the water pipe (2) and is open up to the free end (8*a*) of the leg (8) in pocket-like fashion.

\* \* \* \* \*